(12) United States Patent
Kim et al.

(10) Patent No.: US 12,509,591 B2
(45) Date of Patent: Dec. 30, 2025

(54) CONDUCTIVE POLYMER ADHESIVE AND METHOD OF PREPARING THE SAME

(71) Applicant: Korea Institute of Science and Technology, Seoul (KR)

(72) Inventors: HeeSuk Kim, Seoul (KR); JeeIn Jung, Seoul (KR); SeungJun Chung, Seoul (KR); JeongGon Son, Seoul (KR); Phillip Lee, Seoul (KR); Youngpyo Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 161 days.

(21) Appl. No.: 17/703,694

(22) Filed: Mar. 24, 2022

(65) Prior Publication Data

US 2023/0212409 A1   Jul. 6, 2023

(30) Foreign Application Priority Data

Dec. 31, 2021   (KR) .......................... 10-2021-0193785

(51) Int. Cl.
*C09D 183/04*   (2006.01)
*C08J 7/04*   (2020.01)
(Continued)

(52) U.S. Cl.
CPC .............. *C09D 5/24* (2013.01); *C08J 7/0427* (2020.01); *C08J 7/044* (2020.01); *C09D 7/62* (2018.01);
(Continued)

(58) Field of Classification Search
CPC ... C09D 5/24; C09D 7/62; C09D 7/68; C09D 7/69; C09D 7/70; C09D 183/04;
(Continued)

(56) References Cited

U.S. PATENT DOCUMENTS

2014/0030509 A1* 1/2014 Kuder ...................... H01B 1/22
252/514
2015/0376481 A1* 12/2015 Larson ................... C09J 133/14
524/506
(Continued)

FOREIGN PATENT DOCUMENTS

CN   101805574 A   *   8/2010
CN   112724878 A   *   4/2021
(Continued)

OTHER PUBLICATIONS

Machine Translation of CN 112724878 A (Year: 2024).*
(Continued)

*Primary Examiner* — Scott R. Walshon
(74) *Attorney, Agent, or Firm* — Studebaker Brackett PLLC

(57) ABSTRACT

Disclosed is a conductive polymer composite according to various embodiments of the present invention in order to implement the above-described object. The conductive polymer composite may include a polymer adhesive which includes a curable polymer and a curing agent, a conductive filler made of a metal having electrical properties, and a substituting agent configured to substitute for or remove a lubricant layer applied on the conductive filler.

16 Claims, 11 Drawing Sheets

(51) Int. Cl.
- *C08J 7/044* (2020.01)
- *C08K 9/04* (2006.01)
- *C09D 5/24* (2006.01)
- *C09D 7/40* (2018.01)
- *C09D 7/62* (2018.01)
- *H01B 1/22* (2006.01)

(52) U.S. Cl.
CPC ............... *C09D 7/68* (2018.01); *C09D 7/69* (2018.01); *C09D 7/70* (2018.01); *C09D 183/04* (2013.01); *H01B 1/22* (2013.01); *C08J 2483/04* (2013.01); *C08K 9/04* (2013.01); *C08K 2201/001* (2013.01); *C08K 2201/003* (2013.01); *C08K 2201/005* (2013.01)

(58) Field of Classification Search
CPC ...... C08J 7/0247; C08J 7/044; C08J 2483/04; H01B 1/22; H01B 1/20; C08K 9/04; C08K 2201/001; C08K 2201/003; C08K 2201/005; C08K 2003/085; C08K 3/08; C08K 9/02; C08K 2003/0806; C08K 2003/0862; C09J 183/04; C09J 11/04; C09J 9/02
See application file for complete search history.

(56) References Cited

U.S. PATENT DOCUMENTS

2020/0181463 A1\* 6/2020 Kim .................. C08K 3/045
2022/0077099 A1\* 3/2022 Choi ..................... C09J 5/00

FOREIGN PATENT DOCUMENTS

| KR | 10-2016-0139203 A | 12/2016 | |
|---|---|---|---|
| KR | 10-2020-0069639 A | 6/2020 | |
| WO | WO-2021182327 A1 \* | 9/2021 | ......... B23K 35/0238 |

OTHER PUBLICATIONS

Machine Translation of CN 101805574A (Year: 2024).\*
Kowalik et al, "Conductive Adhesives with Self-Organized Silver Particles", 2012 IOP Conf. Ser. Mater. Sci. Eng. 40 012033 (Year: 2012).\*
Zhan et al., "Silver Frameworks Based on Self-Sintering Silver Micro-Flakes and Its Application in Low Temperature Curing Conductive Pastes", Journal of Materials Science: Materials in Electronics (2019) 30:21343-21354 (Year: 2019).\*
Tan et al., "Removal of Chemisorbed Lubricant on the Surface of Silver Flakes by Chemicals", Applied Surface Science 253 (2006) 703-707 (Year: 2006).\*

\* cited by examiner

FLAKE

PARTICLE

WIRE

TUBE

Oxalic acid
(C = 2)

Malonic acid
(C = 3)

Succinic acid
(C = 4)

Glutaric acid
(C = 5)

Adipic acid
(C = 6)

CONDUCTIVE POLYMER ADHESIVE AND METHOD OF PREPARING THE SAME

CROSS-REFERENCE TO RELATED APPLICATION

This application claims priority to and the benefit of Korean Patent Application No. 10-2021-0193785, filed on Dec. 31, 2021, the disclosure of which is incorporated herein by reference in its entirety.

BACKGROUND

1. Field of the Invention

The present invention relates to a conductive polymer composite for bonding a flexible substrate and a method of preparing the same, and more particularly, to a conductive polymer composite for bonding a flexible substrate, which has excellent electrical properties, improved adhesive properties, flexibility, and stretchability on a flexible substrate, and a method of preparing the same.

2. Discussion of Related Art

Recently, mechanical flexibility of electronic products has become an important factor for body-friendly designs and the application of various designs. Accordingly, in addition to conductive elements in which electrodes are formed on a rigid substrate, research and development has been actively conducted on flexible/stretchable electronic elements in which electrodes are formed on a flexible or stretchable substrate.

In a flexible electronic device, there may be various mechanical, physical, or electrical properties required between components constituting the flexible electronic device. Specifically, materials included in a flexible electronic device may be required for excellent physical properties and adhesive properties for providing flexibility in addition to excellent conductivity and excellent electrical properties for facilitating grounding and signal transmission. In other words, since the flexible electronic device should maintain electrical or physical properties even when the flexible electronic device is freely stretched by external stress, the flexible electronic device should be formed through a material having stable electrical conductivity, flexible physical properties, high adhesive properties, and the like.

In particular, the use of an adhesive having conductivity in a flexible electronic device may be more important. A polymer material constituting such an adhesive may have various mechanical properties through a molecular design and may have improved electrical conductivity by adding various conductive fillers thereto. In general, an epoxy, which is a polymer material constituting a conductive adhesive and has a strong shrinkage phenomenon, is used as a matrix, but an epoxy-based conductive adhesive may have a limitation in being applied to flexible electronic devices due to high rigidity thereof. In addition, since an epoxy-based conductive adhesive cannot continuously maintain adhesive properties and conductivity when a substrate is stretched or contracted by external stress, there is a risk of degrading the reliability of a flexible electronic device.

Accordingly, in the art, there may be a demand for a conductive composite and conductive paste which have excellent adhesive strength on a flexible substrate and have high electrical conductivity and stable electrical conductivity during expansion and contraction.

SUMMARY OF THE INVENTION

The present invention is directed to providing to a conductive polymer composite which has improved adhesive strength on a flexible substrate having flexibility and stretchability and does not cause degradation in performance related to electrical conductivity and adhesion even under external stress.

The present invention is also directed to providing various flexible electronic devices such as a flexible display, a flexible transistor, a flexible sensor, an actuator, and a solar cell which have improved electrical properties by forming a conductive polymer adhesive film on a flexible substrate using a conductive polymer adhesive to provide flexibility and stretchability and concurrently improve conductivity and minimize a decrease in conductivity due to external stress.

The technical objects of the present invention are not limited to the above-described ones, and the other undescribed technical objects will become apparent to those skilled in the art from the following description.

According to an aspect of the present invention, there is provided a conductive polymer composite including a polymer adhesive which includes a curable polymer and a curing agent, a conductive filler made of a metal having electrical properties, and a substituting agent configured to substitute for or remove a lubricant layer applied on the conductive filler.

The polymer adhesive may have a viscosity of 3,000 mPa·s to 150,000 mPa·s before curing.

The polymer adhesive may have a bulk tensile strength of 0.1 MPa to 100 MPa and a volume shrinkage ratio of 1% to 20% after curing.

The polymer adhesive may include 10 to 200 parts by weight of the curing agent with respect to 100 parts by weight of the curable polymer.

The conductive polymer composite may include 100 to 500 parts by weight of the conductive filler with respect to 100 parts by weight of the polymer adhesive.

The polymer adhesive may include at least one selected from among an epoxy resin, a silicone-based resin, a urethane-based resin, an acrylic-based resin, an isoprene-based resin, a chloroprene-based resin, a fluoro-based resin, butadiene rubber, and styrene-butadiene rubber.

The polymer adhesive may be a silicone-based resin.

The metal may include at least one selected from among gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La), and iridium (Ir).

The metal in the form of at least one of wires, flakes, particles, or tubes may be dispersed in the organic solvent.

The metal may be at least one selected from among metal particles having a diameter of 100 nm to 200 nm, metal particles having a diameter of 1 μm to 4 μm, and metal particles having a diameter of 5 μm to 10 μm.

By using an in-situ method, the substituting agent may substitute the lubricant layer with at least one selected from among a material having methyl (—CH$_3$), a material having a carboxylic acid (—COOH), a material having a dicarboxylic acid (—COOH), a material having a thiol functional group (—SH), a material having an amine functional group (—NH$_3$), a material having a phosphonic acid (—H$_2$PO$_3$), and a material having a phosphoric acid (—H$_2$PO$_4$).

The substituting agent may be included in a content that is greater than 0 parts by weight and is less than or equal to 10 parts by weight with respect to 100 parts by weight of the metal.

The conductive polymer composite may be attachable on a flexible substrate and may be used as an electrode when bonded to the flexible substrate, and the flexible substrate may be a substrate made of at least one selected from among a silicone-based resin, a urethane-based resin, polyimide (PI), polyethylene terephthalate (PET), polyethylene naphthalate (PEN), polytetrafluoroethylene (PTFE), polystyrene (PS), and polyethersulfonate (PES).

According to another aspect to of the present invention, there is provided a method of preparing a conductive polymer composite for bonding a flexible substrate, the method including dispersing a substituting agent in a conductive filler including an organic solvent and a metal and substituting for or removing a lubricant layer to prepare a conductive filler liquid dispersion, mixing a curable polymer and a curing agent into the conductive filler liquid dispersion and forming an adhesive mixture including the conductive filler and a polymer adhesive, coating an upper surface of a flexible substrate with the adhesive mixture and forming a mixture coating layer, and curing the mixture coating layer and forming a conductive polymer composite on the flexible substrate.

The polymer adhesive may include the curable polymer and the curing agent and may include at least one selected from among an epoxy resin, a silicone-based resin, a urethane-based resin, an acrylic-based resin, an isoprene-based resin, a chloroprene-based resin, a fluoro-based resin, butadiene rubber, and styrene-butadiene rubber.

The polymer adhesive may be a silicone-based resin.

The metal may include at least one selected from among gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La), and iridium (Ir), and the metal in the form of at least one of wires, flakes, particles, or tubes may be dispersed in the lubricant layer.

The metal may be at least one selected from among metal particles having a diameter of 100 nm to 200 nm, metal particles having a diameter of 1 μm to 4 μm, and metal particles having a diameter of 5 μm to 10 μm.

The polymer adhesive may include 10 to 200 parts by weight of the curing agent with respect to 100 parts by weight of the curable polymer, and the adhesive mixture may include 100 to 500 parts by weight of the conductive filler with respect to 100 parts by weight of the polymer adhesive.

The coating for the forming of the mixture coating layer may be performed through at least one coating method of a doctor blade method, a flat screen method, a spin coating method, a roll coating method, a flow coating method, a gravure printing method, and a flexographic printing method, and the mixture coating layer may have a thickness of 10 μm to 200 μm.

The flexible substrate may be a substrate made of at least one selected from among a silicone-based resin, a urethane-based resin, PI, PET, PEN, PTFE, PS, and PES.

The curing of the mixture coating layer may be performed for 15 minutes to 180 minutes at a temperature of 0° C. to 200° C.

By using an in-situ method, the substituting agent may substitute the lubricant layer with at least one selected from among a material having methyl (—CH$_3$), a material having a carboxylic acid (—COOH), a material having a dicarboxylic acid (—COOH), a material having a thiol functional group (—SH), a material having an amine functional group (—NH$_3$), a material having a phosphonic acid (—H$_2$PO$_3$), and a material having a phosphoric acid (—H$_2$PO$_4$).

Preparation of the conductive filler liquid dispersion may include dispersing a combination including the substituting agent, of which a content is greater than 0 parts by weight and is less than or equal to 10 parts by weight with respect to 100 parts by weight of the metal, in the organic solvent and preparing the conductive filler liquid dispersion, and the organic solvent may include at least one selected from among chloroform, toluene, ethanol, methanol, dichloromethane, tetrahydrofuran, and methyl ethyl ketone.

According to still another aspect of the present invention, there is provided a flexible electronic device including the above-described conductive polymer composite.

The flexible electronic device may be at least one of a flexible display, a flexible transistor, a flexible sensor, an actuator, and a solar cell.

According to yet another aspect of the present invention, there is provided a flexible electronic device including a flexible substrate in which an auxetic including a plurality of unit structures is formed, and a flexible electrode formed on the flexible substrate through a conductive polymer composite, wherein the conductive polymer composite includes a polymer adhesive which includes a curable polymer and a curing agent, a conductive filler made of a metal having electrical properties, and a substituting agent configured to substitute for or remove a lubricant layer applied on the conductive filler.

According to yet another aspect of the present invention, there is provided a method of manufacturing a flexible electronic device, the method including positioning a flexible substrate in which an auxetic including a plurality of unit structures is formed, preparing a conductive polymer composite, and positioning a flexible electrode on the flexible substrate through the conductive polymer composite, wherein the preparing of the conductive polymer composite includes dispersing a substituting agent in a conductive filler including an organic solvent and a metal and substituting for or removing a lubricant layer to prepare a conductive filler liquid dispersion, mixing a curable polymer and a curing agent into the conductive filler liquid dispersion and forming an adhesive mixture including the conductive filler and a polymer adhesive, coating an upper surface of a flexible substrate with the adhesive mixture and forming a mixture coating layer, and curing the mixture coating layer and forming the conductive polymer composite on the flexible substrate.

Other concrete matters of the present invention are included in the detailed description and drawings of the specification.

BRIEF DESCRIPTION OF THE DRAWINGS

Now, various aspects will be described with reference to the accompanying drawings and like reference numerals collectively designate like elements. In the following embodiments, for the purpose of description, various specific details are suggested to provide overall understanding of one or more aspects. However, it is obvious that the aspects may be embodied without the specific details.

DETAILED DESCRIPTION OF EXEMPLARY EMBODIMENTS

Figure 1:
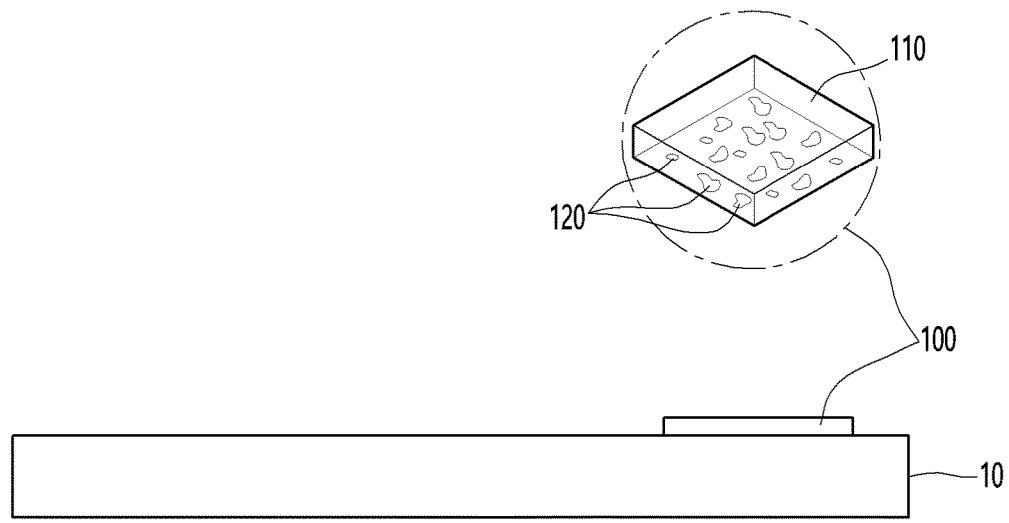
FIG. 1 shows an exemplary diagram illustrating a conductive polymer composite provided in contact with a flexible substrate according to one embodiment of the present invention.

Various embodiments and/or aspects will be disclosed with reference to the accompanying drawings. In the following description, for the purpose of description, various specific details are disclosed to provide overall understanding of one or more aspects. However, those skilled in the art may understand that the aspect(s) may be embodied without having the specific details. The following description and accompanying drawings thoroughly describe specific exemplary aspects of one or more aspects. However, the aspects are provided for an illustrative purpose, some of various methods in principles of the various aspects may be used, and the descriptions are intended to include all of the aspects and equivalents thereof. Specifically, the "embodiment," "example," "aspect," "illustration," and the like used in the present specification may not be interpreted as a described arbitrary aspect or design being better than or more advantageous than other aspects or designs.

Hereinafter, in the drawings, the same or similar elements are denoted by the same reference numerals even though they are depicted in different drawings, and a detailed description of the same or similar elements will be omitted. In addition, in the following description of the embodiments disclosed herein, a detailed description of related arts will be omitted when it is determined that the gist of the embodiments disclosed herein may be obscured. Also, the accompanying drawings are used to help easily understand the embodiments disclosed herein, and it should be understood that the technical idea disclosed herein are not limited by the accompanying drawings.

It will be understood that, although the terms first, second, etc. may be used herein to describe various elements or components, these elements or components should not be limited by these terms. These terms are only used to distinguish one element or component from another element or component. Thus, a first element or component discussed below could be termed a second element or component without departing from the technical idea of the present invention.

Unless otherwise defined, all terms (including technical and scientific terms) used in the present specification may be used as the same meaning which may be commonly understood by the person with ordinary skill in the art to which the present invention belongs. It will be further understood that terms defined in commonly used dictionaries should not be interpreted in an idealized or excessive sense unless expressly and specifically defined.

Further, the term "or" is intended to mean not exclusive "or" but implicational "or." That is, when it is not specifically designated or unclear in the context, "X uses A or B" is intended to refer to one of natural implicational substitutions. In other words, "X uses A or B" may be applied to any case of "X uses A," "X uses B," or "X uses both A and B." Further, it should be understood that the term "and/or" used in the present specification indicates and includes all possible combinations of one or more items among related listed items.

It should be understood that the term "comprise" and/or "comprising" means existence of the corresponding feature and/or element but does not exclude the existence or addition of one or more other features, elements, and a group thereof. In addition, when not separately defined or not clear in terms of the context that a singular form is indicated, it should be construed that the singular form generally means "one or more" in the present specification and the claims.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

In addition, a term "module," "unit," or "portion" of an element used herein is assigned or incorporated for convenience of specification description, and the suffix itself does not have a distinguished meaning or function.

It will be understood that when an element or layer is referred to as being "on" or "above" another element or layer, the element or layer can be directly on or above another element or layer or intervening elements or layers may be present. In contrast, when an element is referred to as being "directly on" or "directly above," there are no intervening elements or layers.

Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or in operation, in addition to the orientation depicted in the figures.

For example, when the device in the figures is turned over, elements described as "below" or "beneath" or "under"

other elements or features would then be oriented "above" the other elements or features. Thus, the exemplary term "below" can encompass both an orientation of above and below. Since an element may be oriented in another direction, the spatially-relative terms may be interpreted in accordance with the orientation of the element.

The objects and effects of the present invention and technical solutions for accomplishing these may be apparent with reference to embodiments to be described below in detail along with the accompanying drawings. In the description of the present invention, when it is determined that detailed descriptions of known functions or configurations unnecessarily obscure the subject matter of the present invention, the detailed descriptions will be omitted. The terms as set forth herein are defined in consideration of the functions of the present invention and may vary according to customs or the intent of a user and an operator.

However, the present invention is not limited to the embodiments set forth below and may be embodied in various other forms. The present embodiments may be provided to make the present invention complete and to enable the person skilled in the art to fully understand the category of the present invention. The present invention may be defined only by the category described in the appended claims. Thus, the definition may be made based on the entirety of the description of the present specification.

Recently, as research and development is actively being conducted on flexible electronic devices, there is an increasing demand for technology development related to a polymer composite having conductivity. A flexible electronic device may refer to a flexible substrate freely deformable in response to external stress and electronic elements positioned on the corresponding flexible substrate and may refer to an electronic device that can maintain electrical/physical properties even when mechanical deformation occurs or external force is applied. For example, the flexible electronic device not only increase a degree of freedom in design due to excellent mechanical variability thereof but also secure mechanical stability against an external force, thereby being used in various industrial fields. For example, the flexible electronic device is expanding to markets such as wearable devices, electronic skin, smartphones, medical devices, healthcare monitoring systems, defense industries, and aerospace industries.

In general, a flexible electronic device (or a soft platform) may include a flexible substrate, electrodes, and elements, which have flexibility, and an adhesive for fixing or bonding each component onto a substrate. The electrode may refer to a component which transmits electrical energy to the flexible electronic device. For example, the electrode may refer to a terminal through which a current flows into or from a conductor in a circuit. The element may refer to a circuit component included in the device and may include, for example, a coil, a capacitor, a resistor, a transistor, a diode, and a thermistor. In order to integrate the above-described components on the substrate, the flexible electronic device may include the adhesive implemented through a conductive material. In particular, the use of an adhesive having conductivity in the flexible electronic device may be more important. A polymer material constituting such an adhesive may have various mechanical properties through a molecular design and may have improved electrical conductivity by adding various conductive fillers thereto.

Specifically, since a flexible electronic device may be variously deformed such as being contracted or expanded by an external force, the adhesive role is important in preventing components integrated on a substrate from being separated even in such deformation. In addition, when elements are provided in microunits, since a distance between the elements is decreased and an electrode also becomes smaller, an arrangement of the elements or connection thereof with the electrode may become difficult, it may be important that a placement or arrangement of each component is maintained constant even when the flexible electronic device is deformed. In other words, since a flexible electronic device is more freely deformable than general electronic devices, in order to prevent separation of components in response to various deformations and to prevent a failure of the electronic device, the flexible electronic device should be formed to include an adhesive having certain adhesive strength or more. In addition, the adhesive should be provided to have certain adhesive strength or more and concurrently should maintain certain electrical conductivity or more even during stretching according to deformation of a substrate.

In general, an epoxy, which is a polymer material constituting a conductive adhesive and has a strong shrinkage phenomenon, is used as a matrix, but an epoxy-based conductive adhesive may have a limitation in being applied to flexible electronic devices due to high rigidity thereof. In addition, it may be difficult for the epoxy-based conductive adhesive to continuously maintain adhesive properties and conductivity when a substrate is stretched or contracted by external stress. For example, when a metal is additionally added to improve conductivity, adhesive strength may be lowered, and when a polymer material of an adhesive component is added to improve adhesive strength, conductivity may be lowered.

In addition, for a specific example, in order to prevent the agglomeration of silver particles (for example, silver flakes) imparting conductivity, a conventional epoxy-based conductive adhesive may be formed through a conductive filler including a lubricant layer. Such a lubricant layer may allow silver flakes to be uniformly dispersed but is made of fatty acids and thus surrounds silver flakes. Accordingly, a distance between the silver flakes is increased to lower electrical conductivity, thereby resulting in a risk of degrading the reliability of a flexible electronic device.

A conductive polymer composite 100 of the present invention may allow various components (for example, elements) to be stably integrated on a flexible substrate 10 constituting a flexible electronic device related to at least one of a flexible display, a flexible transistor, a flexible sensor, an actuator, and a solar cell. In other words, the conductive polymer composite 100 of the present invention can stably support or bond electronic elements onto the flexible substrate even when the flexible substrate 10 is deformed by an external force. That is, the conductive polymer composite 100 can provide excellent adhesive strength in a substrate having flexibility, in particular, in a stretchable substrate.

In addition, the conductive polymer composite 100 of the present invention prevents a decrease in conductivity even during stretching to secure high electrical conductivity, thereby providing improved stability to secure the reliability of an electronic device.

Additionally, the conductive polymer composite 100 of the present invention has an advantage in that costs thereof may be reduced because it is possible to minimize a content of a metal that imparts electrical performance, that is, conductivity.

Components and structural features of the conductive polymer composite 100 of the present invention, a method of preparing the same, and effects thereof will be described in detail below with reference to FIGS. 1 and 12.

Figure 2:
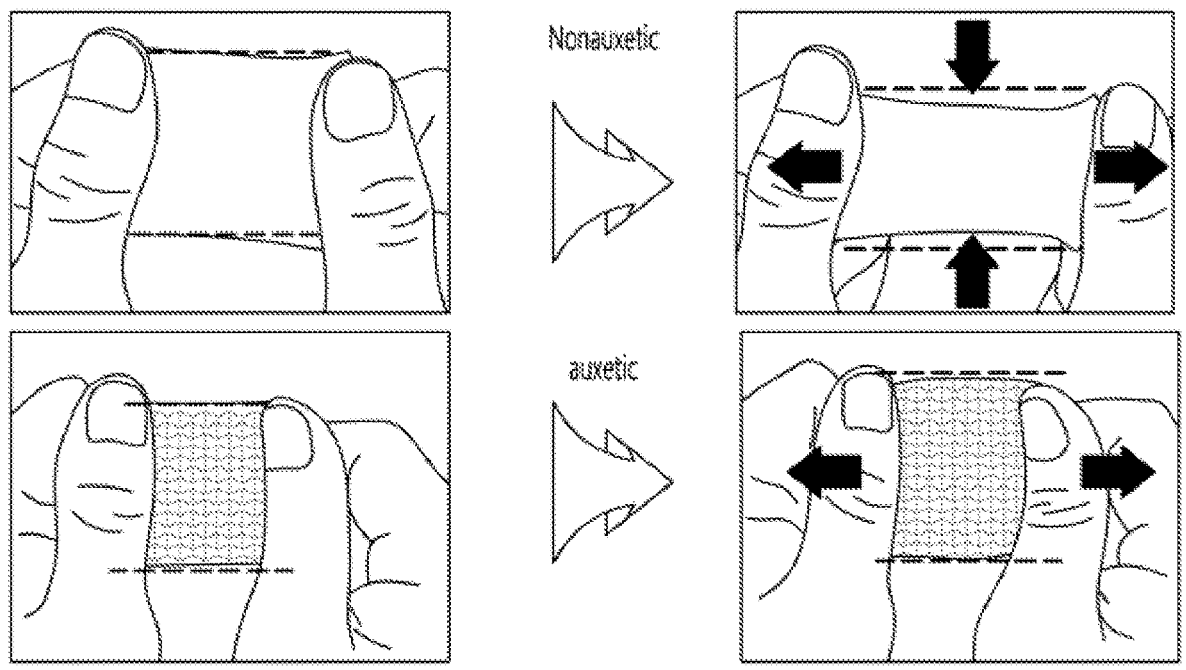
FIG. 2 shows exemplary diagrams illustrating an auxetic structure of a flexible substrate according to one embodiment of the present invention.
Figure 3:
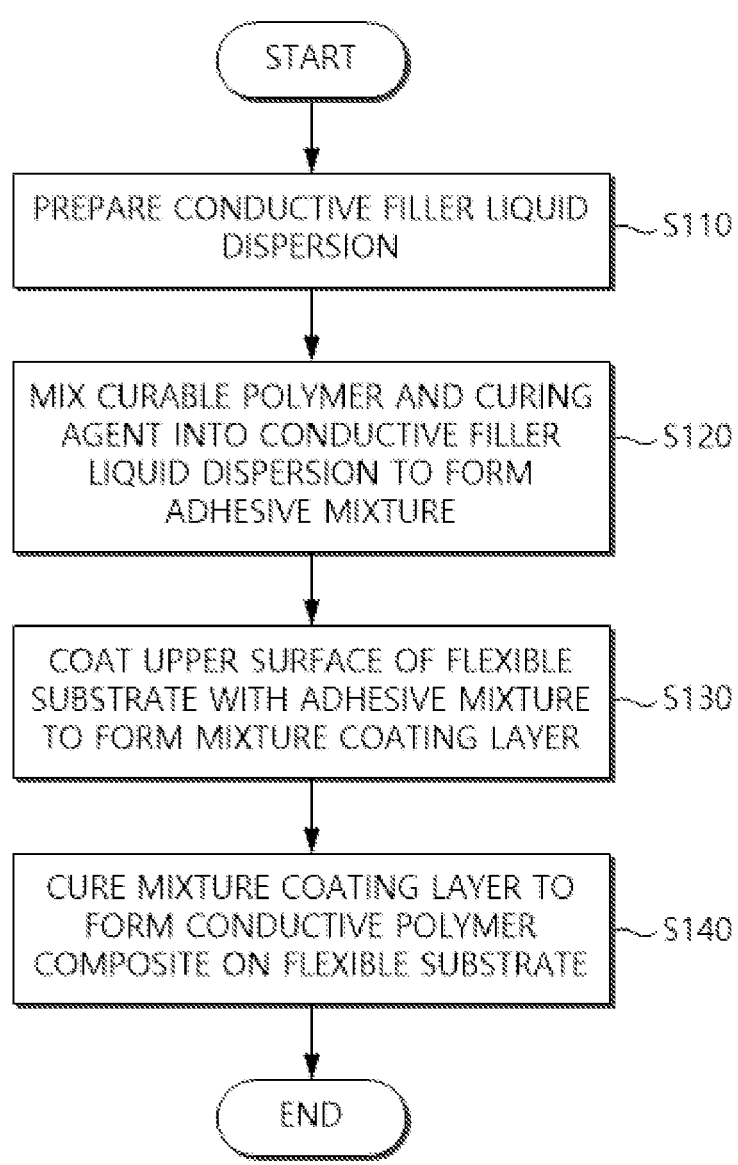
FIG. 3 is an exemplary flowchart related to a method of forming a conductive polymer composite for bonding a flexible substrate according to one embodiment of the present invention.
Figure 4:
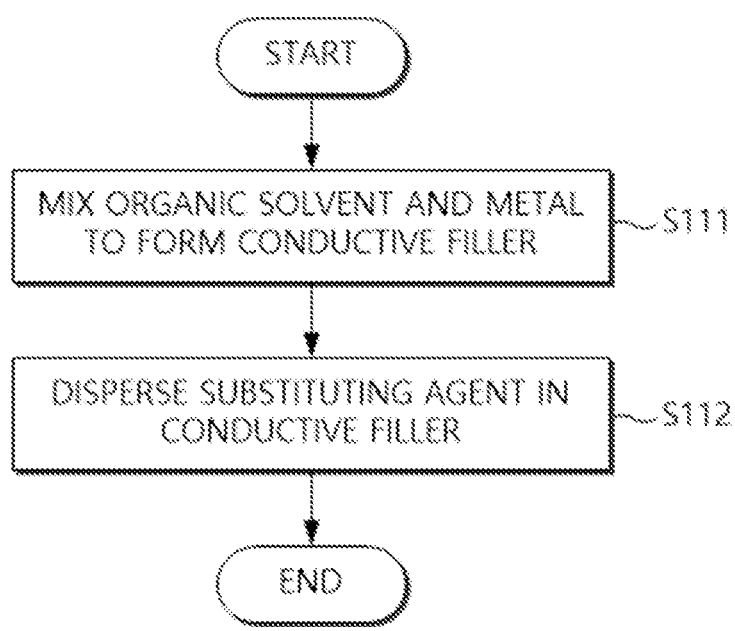
FIG. 4 is an exemplary flowchart related to a process of preparing a conductive filler liquid dispersion.
Figure 5:
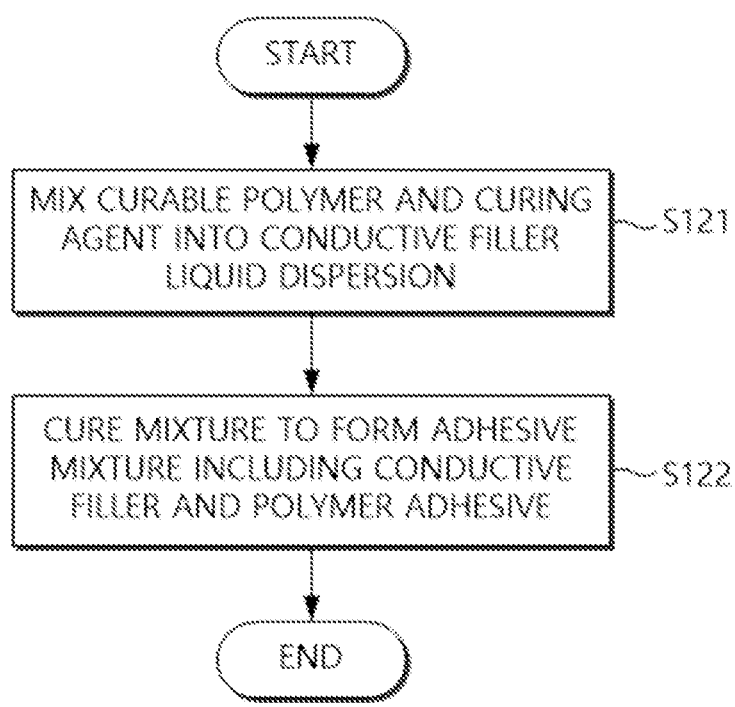
FIG. 5 is an exemplary flowchart related to a process of forming an adhesive mixture.
Figure 6:
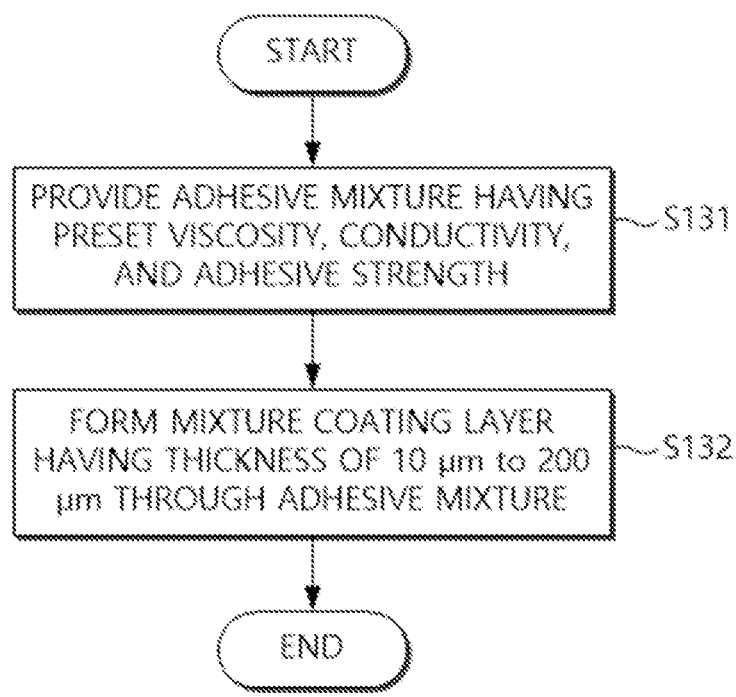
FIG. 6 is an exemplary flowchart related to a process of forming a mixture coating layer on a flexible substrate.
Figure 7:
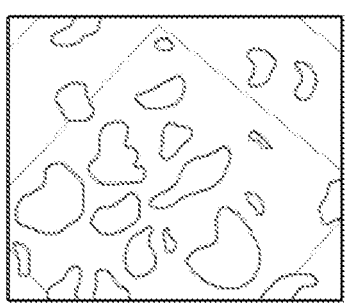
FIG. 7 shows exemplary diagrams illustrating various shapes of metals included in a conductive polymer composite according to one embodiment of the present invention.
Figure 7:
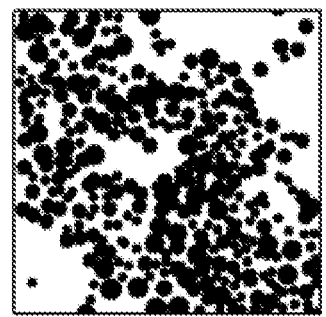
Figure 7:
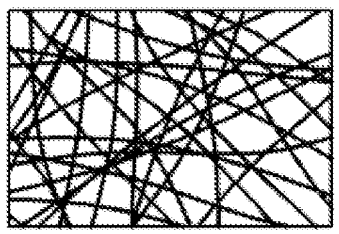
Figure 7:
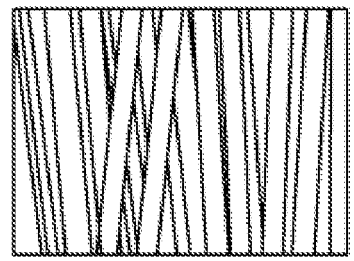
Figure 8:
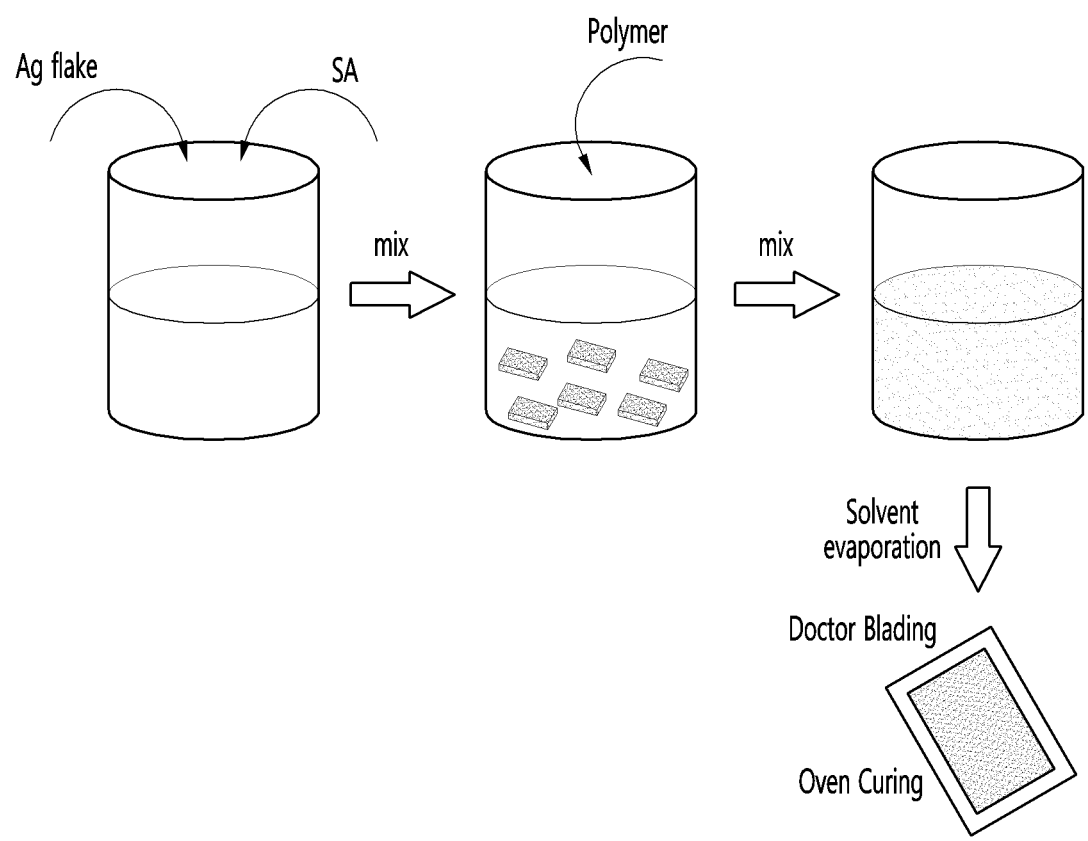
FIG. 8 shows exemplary diagrams illustrating a process of forming a conductive polymer composite according to one embodiment of the present invention.
Figure 9:
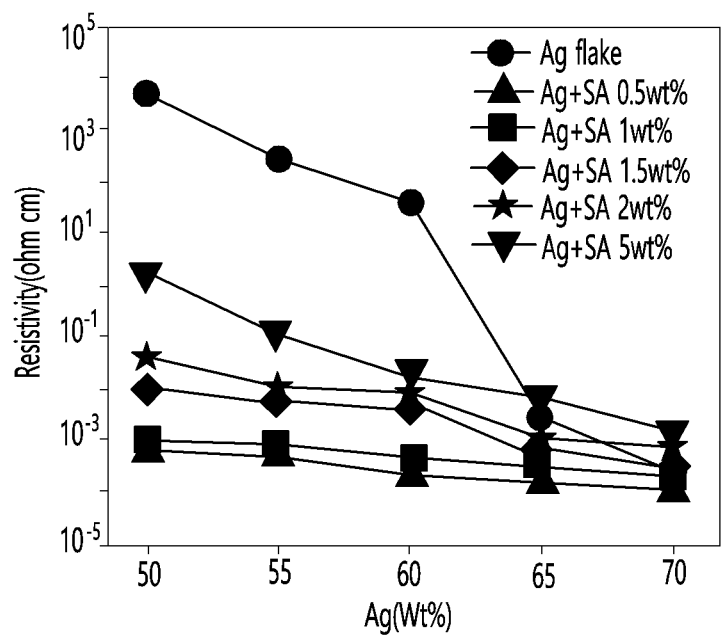
FIG. 9 shows experimental result values showing that resistance is lowered when a substituting agent is included in a conductive polymer composite according to one embodiment of the present invention.
Figure 9:
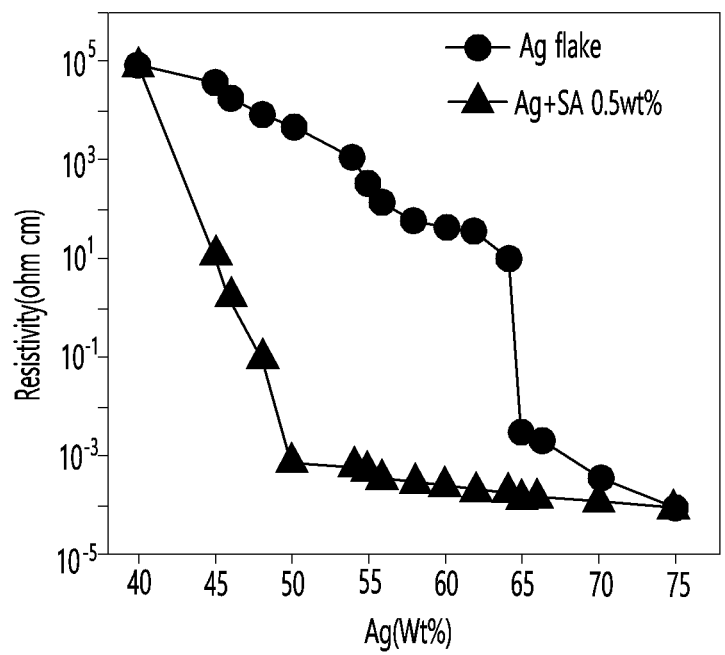
Figure 10:
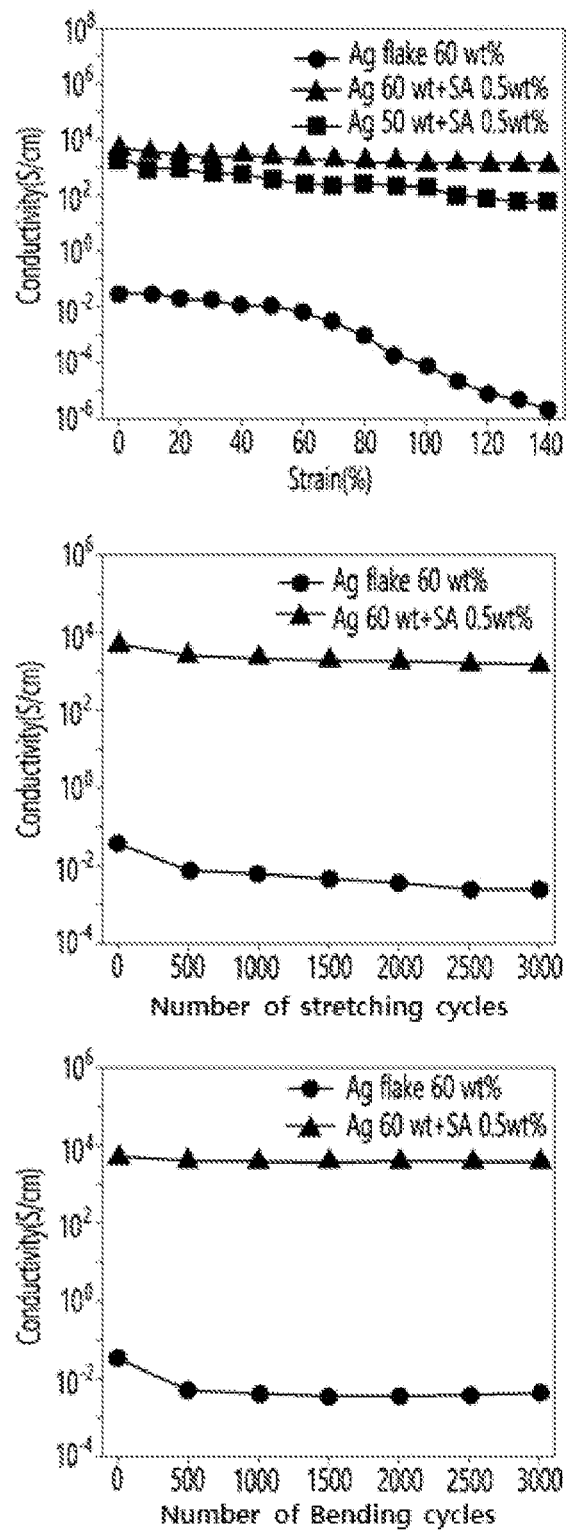
FIG. 10 shows experimental result values showing that electrical conductivity is improved when a substituting agent is included in a conductive polymer composite according to one embodiment of the present invention.
Figure 11:
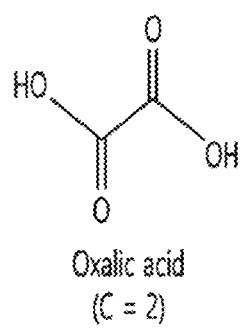
FIG. 11 shows exemplary diagrams for acids usable as a substituting agent according to one embodiment of the present invention.
Figure 11:
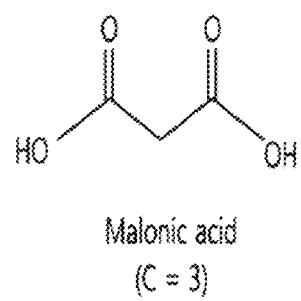
Figure 11:
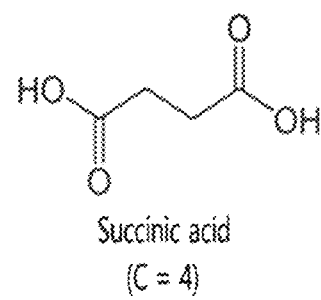
Figure 11:
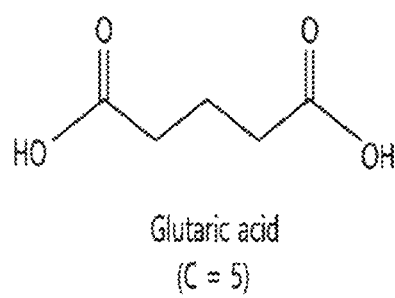
Figure 11:
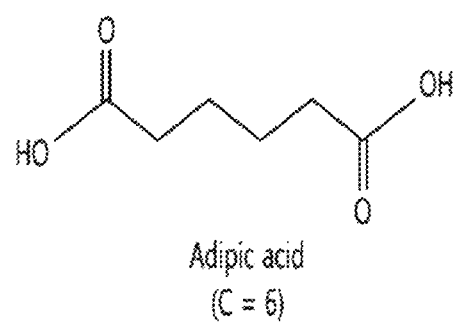

FIG. 1 shows an exemplary diagram illustrating a conductive polymer composite provided in contact with a flexible substrate according to one embodiment of the present invention. FIG. 2 shows exemplary diagrams illustrating an auxetic structure of a flexible substrate according to one embodiment of the present invention. FIG. 3 is an exemplary flowchart related to a method of forming a conductive polymer composite for bonding a flexible substrate according to one embodiment of the present invention. FIG. 4 is an exemplary flowchart related to a process of preparing a conductive filler liquid dispersion. FIG. 5 is an exemplary flowchart related to a process of forming an adhesive mixture. FIG. 6 is an exemplary flowchart related to a process of forming a mixture coating layer on a flexible substrate. FIG. 7 shows exemplary diagrams illustrating various shapes of metals included in a conductive polymer composite according to one embodiment of the present invention. FIG. 8 shows exemplary diagrams illustrating a process of forming a conductive polymer composite according to one embodiment of the present invention. FIG. 9 shows experimental result values showing that resistance is lowered when a substituting agent is included in a conductive polymer composite according to one embodiment of the present invention. FIG. 10 shows experimental result values showing that electrical conductivity is improved when a substituting agent is included in a conductive polymer composite according to one embodiment of the present invention. FIG. 11 shows exemplary diagrams for describing a succinic acid (SA) usable as a substituting agent according to one embodiment of the present invention. FIG. 12 shows experimental result values showing that a resistance of a conductive polymer composite is significantly lowered through an SA according to one embodiment of the present invention.

As shown in FIG. 1, a conductive polymer composite 100 may be provided to be bonded to one surface of a flexible substrate 10. In one embodiment, the conductive polymer composite 100 may be a silicone-based organic polymer and may be used as a matrix in a composite material and an adhesive. In addition, according to an embodiment, the conductive polymer composite 100 may be used as an electrode when bonded to the flexible substrate 10.

The conductive polymer composite 100 may be applied and cured on one surface of the flexible substrate 10 to allow other electronic elements to be bonded onto the flexible substrate 10. In the present invention, the flexible substrate 10 may refer to a substrate having an elastic force or stretchability and may be implemented using, for example, silicone rubber, polyethylene naphthalate (PEN), polyurethane polymer, or the like. For a more specific example, the flexible substrate 10 may be a substrate made of at least one selected from among a silicone-based resin, a urethane-based resin, polyimide (PI), polyethylene terephthalate (PET), PEN, polytetrafluoroethylene (PTFE), polystyrene (PS), and polyethersulfonate (PES). The detailed description of the flexible substrate 10 is merely an example, and the present invention is not limited thereto.

In one embodiment, the flexible substrate 10 may include an auxetic structure. The auxetic structure may be a structure that expands in a direction perpendicular to a typical stretching direction in nature. The flexible substrate 10 may include the auxetic structure to have a negative Poisson's ratio.

A Poisson's ratio may refer to a ratio of transverse strain to longitudinal strain when a tensile force is applied to a material to stretch the material in a specific direction. In other words, the Poisson's ratio may refer to a strain between a transverse direction and a vertical direction.

Most materials have a positive Poisson's ratio because a strain in a stretching direction and a strain in a lateral direction of a material have different signs when a tensile force is applied in a single axis. However, when a material is designed to form a specific lattice structure, a negative Poisson's ratio can be realized macroscopically even when a component has a positive Poisson's ratio.

For a specific example, referring to FIG. 2, in a material having a general non-auxetic structure, when stress is applied in a transverse direction, the material expands in the transverse direction and contracts in a longitudinal direction at the same time. That is, a Poisson's ratio between vertical deformation and transverse deformation to a vertical stress generated inside the material may be positive.

On the other hand, in a material having an auxetic structure, when stress is applied in a transverse direction, the material may expand in both transverse and longitudinal directions. That is, a Poisson's ratio due to vertical stress generated inside the material may be negative.

That is, unlike general materials, the auxetic structure may refer to a material that has a negative Poisson's ratio, that is, the material is designed such that a transverse strain and a longitudinal strain have the same sign. In the flexible substrate 10, a mechanical metamaterial designed in a specific lattice structure is introduced, thereby controlling a negative Poisson's ratio or a strain in a direction perpendicular to a stretching direction. The Poisson's ratio is an inherent characteristic in a material but is controllable by forming a specific structure in the material. Representative auxetic structures of which a Poisson's ratio is adjustable to a negative value may include, for example, a re-entrant structure, a rotating rigid structure, and a chiral structure. The detailed description of the above-described auxetic structure is merely an example, and the present invention is not limited thereto.

According to one embodiment, a conductive polymer composite for bonding a flexible substrate may include a polymer adhesive 110 including a curable polymer and a curing agent, a conductive filler made of a metal having electrical properties, and a substituting agent for removing or substituting for a lubricant layer applied on the conductive filler.

In one embodiment, as shown in FIG. 1, a conductive polymer composite 100 may include a conductive filler 120 and the polymer adhesive 110.

According to an embodiment, the polymer adhesive 110 may be include at least one selected from among a silicone-based resin, a urethane-based resin, an acrylic-based resin, an isoprene-based resin, a chloroprene-based resin, a fluoro-based resin, butadiene rubber, and styrene-butadiene rubber. In a more exemplary embodiment, the polymer adhesive 110 may be a silicone-based resin.

The conductive filler 120 may be made of a metal having electrical properties. Here, the metal may be include, for example, at least one selected from among gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La), and iridium (Ir).

According to an embodiment, the metal may be preferably at least one selected from among metal particles having a diameter of 100 nm to 200 nm, metal particles having a diameter of 1 μm to 4 μm, and metal particles having a diameter of 5 μm to 10 μm and may be more preferably a mixture of metal particles having a diameter of 100 nm to 200 nm, metal particles having a diameter of 1 μm to 4 μm, and metal particles having a diameter of 5 μm to 10 μm.

The conductive filler 120 formed to include such a metal may further include an organic solvent. Here, the organic solvent may be for uniformly dispersing a metal (for example, silver flakes) and dissolving a substituting agent. According to an embodiment, the organic solvent may include, for example, at least one selected from among chloroform, toluene, ethanol, methanol, dichloromethane, tetrahydrofuran, and methyl ethyl ketone. That is, since the metal having electrical properties may be uniformly dispersed in the organic solvent, the conductive polymer composite 100 including the conductive filler 120 may be provided to have electrical conductivity.

In addition, according to one embodiment, the metal in the form of at least one of wires, flakes, particles, or tubes may be dispersed in the organic solvent. In other words, the metal may be provided to be uniformly dispersed in the solvent through various shapes such as wire, flake, particle, and tube shapes. In one example, a degree in which conductivity is exhibited may be different according to a form in which the metal is provided. For example, in a case in which the metal is silver, when the metal has a wire shape, conductivity may be exhibited when a content of the metal is in a range of 15 wt % to 20 wt %, and when the metal has a flake shape, conductivity may be exhibited when a content of the metal is 50 wt % or more. That is, when the metal has the wire shape, conductivity may be exhibited through a minimized content of the metal, thereby reducing costs.

In one embodiment, the conductive polymer composite 100 may be provided to have certain adhesive strength or more so as to be bonded to the flexible substrate 10. For example, the conductive polymer composite 100 may have an adhesive strength of 0.8 to 22 N/mm². Even when the flexible substrate 10 is stretched or contracted, the described numerical values of the adhesive strength may be in an appropriate range so as to prevent separation of elements on a substrate. However, the present invention is not limited thereto. According to an embodiment, the adhesive strength of the conductive polymer composite 100 may be based on the polymer adhesive 110.

Specifically, the conductive polymer composite 100 may include the polymer adhesive 110 including the curable polymer and the curing agent. The polymer adhesive of the present invention may include 10 to 200 parts by weight of the curing agent with respect to 100 parts by weight of the curable polymer. The curable polymer may include a thermosetting polymer and a photocurable polymer. The polymer adhesive 110 may have certain adhesive strength or more as a curing process according to a preset temperature and time is performed.

According to one embodiment, the conductive polymer composite 100 may have a viscosity of 3,000 mPa·s to 150,000 mPa·s before curing. In addition, after curing, the conductive polymer composite 100 may have a bulk tensile strength of 0.1 MPa to 100 MPa and a volume shrinkage ratio of 1% to 20%. When the viscosity of the conductive polymer composite 100 before curing or the bulk tensile strength and volume shrinkage ratio thereof after curing deviate from the above-described numerical values, adhesive strength with a substrate or element, mechanical properties, or electrical properties may be lowered.

In addition, the conductive polymer composite 100 may include 100 to 500 parts by weight of the conductive filler with respect to 100 parts by weight of the polymer adhesive. In other words, the conductive polymer composite 100 may be formed by mixing 100 to 500 parts by weight of the conductive filler formed of the metal with respect to 100 parts by weight of the polymer adhesive formed of the curable polymer and the curing agent. In one embodiment, when the content of the conductive filler is less than 100 parts by weight with respect to 100 parts by weight of the polymer adhesive, conductivity may be lowered, and when the content of the conductive filler exceeds 500 parts by weight, adhesive strength may be lowered on a flexible substrate.

According to one embodiment of the present invention, the conductive polymer composite 100 may include the substituting agent for removing or substituting for the lubricant layer. For example, the lubricant layer may be provided to prevent the agglomeration of silver particles (for example, silver flakes) imparting conductivity (that is, provided to uniformly disperse silver particles). However, the lubricant layer is made of fatty acids and thus surrounds a metal (that is, silver flakes), and accordingly, a distance between metal materials is increased to lower electrical conductivity, thereby resulting in a risk of degrading the reliability of a flexible electronic device. Accordingly, in the conductive polymer composite 100 of the present invention, by removing or substituting for the lubricant layer through the substituting agent that is a material component having an affinity for a metal, a distance between metals can be decreased to improve electrical conductivity. According to one embodiment of the present invention, the substituting agent may include an SA to substitute for the lubricant layer.

For example, the substituting agent may substitute the lubricant layer with at least one selected from among a material having methyl (—CH$_3$), a material having a carboxylic acid (—COOH), a material having a dicarboxylic acid (—COOH), a material having a thiol functional group (—SH), a material having an amine functional group (—NH$_3$), a material having a phosphonic acid (—H$_2$PO$_3$), and a material having a phosphoric acid (—H$_2$PO$_4$). For a more specific example, the substituting agent may include an SA, and when the substituting agent is added to the conductive polymer composite 100 during a preparing process, a lubricant layer of an existing conductive filler is substituted or removed by being substituted with the SA.

According to one embodiment, when the lubricant layer is removed or substituted with an SA, electrical conductivity may be improved by up to $10^8$ times that of a general composite that does not include a substituting agent (that is, a composite in which an existing lubricant layer is not substituted or removed). Thus, an amount of metal included in a composite can be reduced, thereby significantly reducing manufacturing costs. Such a substituting agent may remove or substitute for the lubricant layer through an in-situ process. Here, the in-situ process may mean that a reaction is terminated through one process and may mean that a lubricant layer is removed or substituted through one mixing without a process of changing a reactor or recombining a reaction product reacted in another reactor.

That is, in the conductive polymer composite 100 of the present invention, a lubricant layer of a metal can be substituted or removed through a relatively simple in-situ method to provide improved electrical conductivity, and even when a flexible substrate is stretched, the stability of a device can be secured through excellent adhesive strength. Hereinafter, a method of preparing a conductive polymer composite and effects provided by a conductive polymer composite will be described in detail with reference to FIGS. 3 to 12.

FIG. 3 is an exemplary flowchart related to a method of preparing a conductive polymer composite for bonding a flexible substrate according to one embodiment of the present invention. The method of preparing a conductive polymer composite for bonding a flexible substrate may include the following operations. The order of operations shown in FIG. 3 may be changed as necessary, and at least one operation may be omitted or added. That is, the following operations are merely one embodiment of the present invention, and the scope of the present invention is not limited thereto.

According to one embodiment of the present invention, the method of preparing a conductive polymer composite for bonding a flexible substrate may include operation S110 of preparing a conductive filler liquid dispersion.

More specifically, as shown in FIG. 4, a method of preparing a conductive filler liquid dispersion may include operation S111 of mixing an organic solvent and a metal to form a conductive filler.

A conductive filler 120 may be made of a metal having electrical properties. The conductive filler 120 may include a metal and an organic solvent for dispersing the corresponding metal. Here, the organic solvent may be for uniformly dispersing a metal (for example, silver flakes) and dissolving a substituting agent. According to an embodiment, the organic solvent may include, for example, at least one selected from among chloroform, toluene, ethanol, methanol, dichloromethane, tetrahydrofuran, and methyl ethyl ketone. That is, since the metal having electrical properties may be uniformly dispersed in the organic solvent, a conductive polymer composite 100 including the conductive filler 120 may be formed to have electrical conductivity. In addition, according to one embodiment, as shown in FIG. 7, the metal in the form of at least one of wires, flakes, particles, or tubes may be dispersed in the organic solvent. In other worlds, the metal may be provided to be uniformly dispersed in the solvent through various shapes such as wire, flake, particle, and tube shapes. In one example, a degree in which conductivity is exhibited may be different according to a form in which the metal is provided. For example, in a case in which the metal is silver, when the metal has a wire shape, conductivity may be exhibited when a content of the metal is in a range of 15 wt % to 20 wt %, and when the metal has a flake shape, conductivity may be exhibited when a content of the metal is 50 wt % or more. That is, when the metal has the wire shape, conductivity may be exhibited through a minimized content of the metal, thereby reducing costs.

According to an embodiment, the metal may be preferably at least one selected from metal particles having a diameter of 100 nm to 200 nm, metal particles having a diameter of 1 μm to 4 μm, and metal particles having a diameter of 5 μm to 10 μm and may be more preferably a mixture of metal particles having a diameter of 100 nm to 200 nm, metal particles having a diameter of 1 μm to 4 μm, and metal particles having a diameter of 5 μm to 10 μm. In addition, as shown in FIG. 4, the method of preparing a conductive filler liquid dispersion may include operation S112 of dispersing a substituting agent in the conductive filler. In one embodiment, the dispersing of the substituting agent in the conductive filler may be performed by simultaneously performing an ultrasonic pulverizing process and a stirring process.

That is, the substituting agent may be added to the conductive filler 120 formed to include the organic solvent and the metal. The substituting agent of the present invention may be for substituting for or removing a lubricant layer by substituting the lubricant layer with another material. For example, the lubricant layer may be provided to prevent the agglomeration of silver particles (for example, silver flakes) imparting conductivity (that is, provided to uniformly disperse silver particles). However, the lubricant layer is made of fatty acids and thus surrounds a metal (that is, silver flakes), and accordingly, a distance between metal materials is increased to lower electrical conductivity, thereby resulting in a risk of degrading the reliability of a flexible electronic device. Accordingly, in the conductive polymer composite 100 of the present invention, by removing or substituting for the lubricant layer through the substituting agent that is a material component having an affinity for a metal, a distance between metals can be decreased to improve electrical conductivity.

For example, by using an in-situ method, the substituting agent may include at least one selected from among material having methyl (—$CH_3$), a material having a carboxylic acid (—COOH), a material having a dicarboxylic acid (—COOH), a material having a thiol functional group (—SH), a material having an amine functional group (—$NH_3$), a material having a phosphonic acid (—$H_2PO_3$), and a material having a phosphoric acid (—$H_2PO_4$).

In a more specific embodiment, the substituting agent may include an SA, and the SA may substitute for or remove the lubricant layer. In other words, when the substituting agent is dispersed in the conductive filler 120, the lubricant layer surrounding the metal may be removed or substituted with the SA.

According to one embodiment, when the lubricant layer is removed or substituted with an SA, electrical conductivity may be improved by up to $10^8$ times that of a general composite that does not include a substituting agent (that is, a composite in which an existing lubricant layer is not substituted or removed). Thus, an amount of metal included in a composite can be reduced, thereby significantly reducing manufacturing costs. Such a substituting agent may remove or substitute for the lubricant layer through an in-situ process. Here, the in-situ process may mean that a reaction is terminated through one process and may mean that a lubricant layer is removed or substituted through one mixing without a process of changing a reactor or recombining a reaction product reacted in another reactor.

That is, in the conductive polymer composite 100 of the present invention, a lubricant layer of a metal can be substituted or removed through a relatively simple in-situ method to provide improved electrical conductivity, and even when a flexible substrate is stretched, the stability of a device can be secured through excellent adhesive strength.

According to one embodiment of the present invention, the method of preparing a conductive polymer composite for bonding a flexible substrate may include operation S120 of mixing a curable polymer and a curing agent in the conductive filler liquid dispersion to form an adhesive mixture.

More specifically, as shown in FIG. 5, the forming of the adhesive mixture may include operation S121 of mixing the curable polymer and the curing agent into the conductive filler liquid dispersion. In one embodiment, the mixing of the curable polymer and the curing agent into the conductive filler liquid dispersion may be performed by simultaneously performing a stirring process and a defoaming process.

Here, the conductive filler liquid dispersion may be a liquid dispersion in which the lubricant layer is substituted with at least one selected from among a material having methyl (—$CH_3$), a material having a carboxylic acid (—COOH), a material having a dicarboxylic acid (—COOH), a material having a thiol functional group (—SH), a material having an amine functional group (—NH$_3$), a material having a phosphonic acid (—H$_2$PO$_3$), and a material having a phosphoric acid (—H$_2$PO$_4$) In a specific embodiment, the conductive filler liquid dispersion may refer to a liquid dispersion including a metal and an SA as the lubricant layer is substituted with the SA.

In one embodiment, a polymer adhesive including the curable polymer and the curing agent may be mixed into the conductive filler liquid dispersion including the metal and the substituting agent, thereby forming the adhesive mixture. In this case, the polymer adhesive may include 10 to 200 parts by weight of the curing agent with respect to 100 parts by weight of the curable polymer. The curable polymer may include a thermosetting polymer and a photocurable polymer.

In addition, as shown in FIG. 5, the forming of the adhesive mixture may include operation S122 of curing a mixture to form the adhesive mixture including the conductive filler and the polymer adhesive. Accordingly, a polymer adhesive 110 may have certain adhesive strength or more as a curing process is performed according to a preset temperature and time.

According to one embodiment of the present invention, the method of preparing a conductive polymer composite for bonding a flexible substrate may include operation S130 of coating an upper surface of a flexible substrate with the adhesive mixture to form a mixture coating layer.

More specifically, as shown in FIG. 6, the forming of the mixture coating layer may include operation S131 of providing the adhesive mixture having preset viscosity, conductivity, and adhesive strength.

In one embodiment, the adhesive mixture (for example, the conductive polymer composite before curing) may have a viscosity of 3,000 mPa·s to 150,000 mPa·s. When the viscosity of the adhesive mixture deviates from the above-described numerical values, adhesive strength with a substrate or element, mechanical properties, or electrical properties may be lowered.

In addition, the conductive polymer composite 100 may include 100 to 500 parts by weight of the conductive filler with respect to 100 parts by weight of the polymer adhesive. In other words, the conductive polymer composite 100 may be formed by mixing 100 to 500 parts by weight of the conductive filler formed of the metal with respect to 100 parts by weight of the polymer adhesive formed of the curable polymer and the curing agent. In one embodiment, when the content of the conductive filler is less than 100 parts by weight with respect to 100 parts by weight of the polymer adhesive, conductivity may be lowered, and when the content of the conductive filler exceeds 500 parts by weight, adhesive strength may be lowered on a flexible substrate. That is, since the adhesive mixture is formed through the above-described ratio, adhesive strength, mechanical properties, and electrical properties can be improved.

As shown in FIG. 6, the forming of the mixture coating layer may include operation S132 of forming the mixture coating layer having a thickness of 10 μm to 200 μm through the adhesive mixture. The applying of the adhesive mixture on the flexible substrate may be performed through at least one coating method of a doctor blade method, a flat screen method, a spin coating method, a roll coating method, a flow coating method, a gravure printing method, and a flexographic printing method. The mixture coating layer formed through such a coating process may have a thickness of 10 μm to 200 μm.

According to one embodiment of the present invention, the method of preparing a conductive polymer composite for bonding a flexible substrate may include operation S140 of curing the mixture coating layer to form the conductive polymer composite on the flexible substrate.

In addition, the conductive polymer composite (that is, the cured mixture coating layer) may have a bulk tensile strength of 0.1 MPa to 100 MPa and a volume shrinkage ratio of 1% to 20%. According to an embodiment, when the bulk tensile strength and volume shrinkage ratio after the conductive polymer composite is cured deviate from the above-described numerical values, adhesive strength with a substrate or element, mechanical properties, or electrical properties may be lowered.

According to one embodiment, the curing of the mixture coating layer may be curing for bonding the mixture coating layer and the flexible substrate and may be performed for 15 minutes to 180 minutes at a temperature of 0° C. to 200° C.

As a more specific example, in summary with reference to FIG. 8, silver flakes and an SA may be added to an organic solvent. In other words, an SA that is a substituting agent may be dispersed in a conductive filler composed of the organic solvent and a metal (that is, silver flakes) to substitute for or remove a lubricant layer, thereby forming a conductive filler liquid dispersion. In addition, a polymer related to a polymer adhesive may be mixed into the conductive filler liquid dispersion in which the lubricant layer is substituted with the SA, thereby forming an adhesive mixture. In addition, coating may be performed on a flexible substrate through a doctor blade method using the adhesive mixture formed by adding the polymer. For example, the doctor blade method may be a coating method in which a slurry (mixture of solid and liquid, that is, the adhesive mixture) is applied on a substrate, and a knife blade (that is, a blade) designed to maintain a constant distance from a bottom is passed over the slurry to form a sheet. In addition, the adhesive mixture may be applied on the substrate to form a mixture coating layer, and curing (for example, oven curing) may be performed on the formed mixture coating layer. Here, the curing of the mixture coating layer may be curing for bonding the mixture coating layer and the flexible substrate and may be performed for 15 minutes to 180 minutes at a temperature of 0° C. to 200° C.

Through the above-described processes, a conductive polymer composite may be formed on the flexible substrate. The conductive polymer composite can stably support or bond electronic elements onto a flexible substrate even when a flexible substrate 10 is deformed by an external force. That is, the conductive polymer composite 100 can provide excellent adhesive strength, in particular, in a stretchable substrate having flexibility.

In addition, the conductive polymer composite 100 of the present invention prevents a decrease in conductivity even during stretching to secure high electrical conductivity, thereby providing improved stability to secure the reliability of an electronic device.

Additionally, the conductive polymer composite 100 of the present invention has an advantage in that costs thereof may be reduced because it is possible to minimize a content of a metal that imparts electrical performance, that is, conductivity. Hereinafter, it will be described in detail below through various experiments and experimental results thereof that the conductive polymer composite 100 of the present invention has improved conductivity on a stretchable substrate.

FIG. 9 shows experimental result values showing that resistance is lowered when a substituting agent is included in a conductive polymer composite according to one embodiment of the present invention. Specifically, FIG. 9 shows resistance values measured when silver flakes related to a metal are provided alone and when an SA is added in different ratios with respect to silver flakes. As shown in FIG. 9, it can be seen that a resistance value is decreased as a content of silver flakes is increased. More specifically, when silver flakes are used alone, and a content thereof is 60 wt % or more, it can be seen that a resistance value is abruptly decreased. However, when silver flakes are added in a content that is 60 wt % or more, adhesive strength of the conductive polymer composite may be significantly lowered. In particular, since the conductive polymer composite of the present invention is bonded onto a stretchable flexible substrate, the conductive polymer composite may be required to have higher adhesive strength as compared with the case of general electronic devices. In addition, as a content of silver flakes is increased, manufacturing costs may be increased, which is economically disadvantageous.

On the other hand, as shown in FIG. 9, when an SA is added, it can be seen that a low resistance value may be maintained even when a content of silver flakes is low. In particular, it can be confirmed that, at 50 wt % of silver flakes, a significant change in resistance value appears according to whether an SA is included.

In a specific embodiment, when a content of an SA is 0.5 wt % with respect to 50 wt % of silver flakes, it can be seen that the lowest resistance value is obtained. Since a lower resistance value may mean higher electrical conductivity, it can be seen that the presence or absence of an SA affects electrical conductivity.

According to one embodiment of the present invention, a content of an SA may be 10 wt % or less. More specifically, when a ratio of an SA is increased, since a degree of dispersion is decreased, electrical conductivity may be rather decreased. Referring to FIG. 9, when a content of an SA is 5 wt % with respect to 50 wt % of silver flakes, it can be seen that a resistance value is higher as compared with a case in which a content of an SA is 0.5 wt % with respect to 50 wt % of silver flakes. That is, when an SA is included or added in a content that is greater than or equal to a certain level (for example, 10 wt %), a resistance value of the conductive polymer composite may be rather increased, and thus, electrical conductivity may be lowered. Accordingly, a content of an SA may be 10 wt % or less.

That is, in the conductive polymer composite of the present invention which is formed to include an SA, it is possible to minimize a content of a metal (for example, silver flake) that imparts electrical properties, thereby reducing costs. In other words, a composite having high conductivity can be implemented with a low metal content. Thus, by minimizing a metal content, adhesive strength can be improved, and the improvement of the adhesive strength can provide an effect of maximizing stability on a flexible substrate.

FIG. 10 shows experimental result values showing that electrical conductivity is improved when a substituting agent is included in a conductive polymer composite according to one embodiment of the present invention. FIG. 10 shows graphs showing experimental values for a degree of change in electrical conductivity according to a strain and the number of stretching cycles. As shown in FIG. 10, it can be confirmed that, when silver flakes and an SA are combined, electrical conductivity is higher as compared with a case in which silver flakes are used alone. In particular, when silver flakes are used alone, and a strain (or elongation) exceeds 60%, it can be confirmed that electrical conductivity is further lowered. On the other hand, when an SA is included, it can be seen that almost no change in electrical conductivity occurs even when a strain is 140%. In addition, when stretching or bending is repeatedly performed, it can be confirmed that, when silver flakes are used alone, electrical conductivity is lowered, but even when stretching or bending is repeatedly performed, it can be confirmed that, when an SA is added, electrical conductivity is not significantly lowered.

That is, a conductive polymer composite of the present invention which is formed to includes an SA, even when stretching occurs, a decrease in conductivity can be prevented to secure high electrical conductivity, thereby providing improved stability to secure the reliability of an electronic device.

FIG. 11 shows exemplary diagrams for describing an SA usable as a substituting agent according to one embodiment of the present invention. In general, a metal may be dispersed through a lubricant layer. However, the lubricant layer is made of fatty acids and thus is provided to have a long chain length (for example, 12), thereby causing a decrease in electrical conductivity. For example, the lubricant layer having the long chain length surrounds a metal (that is, silver flakes), and thus, a distance between metals is increased to lower electrical conductivity, thereby degrading the reliability of a flexible electronic device.

A conductive polymer composite 100 of the present invention may include a dicarboxylic acid material to have improved electrical conductivity. More specifically, the conductive polymer composite 100 may include an SA. An SA may have a relatively short chain length (for example, c=4). In addition, an SA may be a kind of dicarboxylic acids (—COOH) having an additional carboxyl acid and may adjust an interaction between metals (for example, silver flakes). Among materials of dicarboxylic acids (—COOH), an SA may improve electrical conductivity most.

Figure 12:
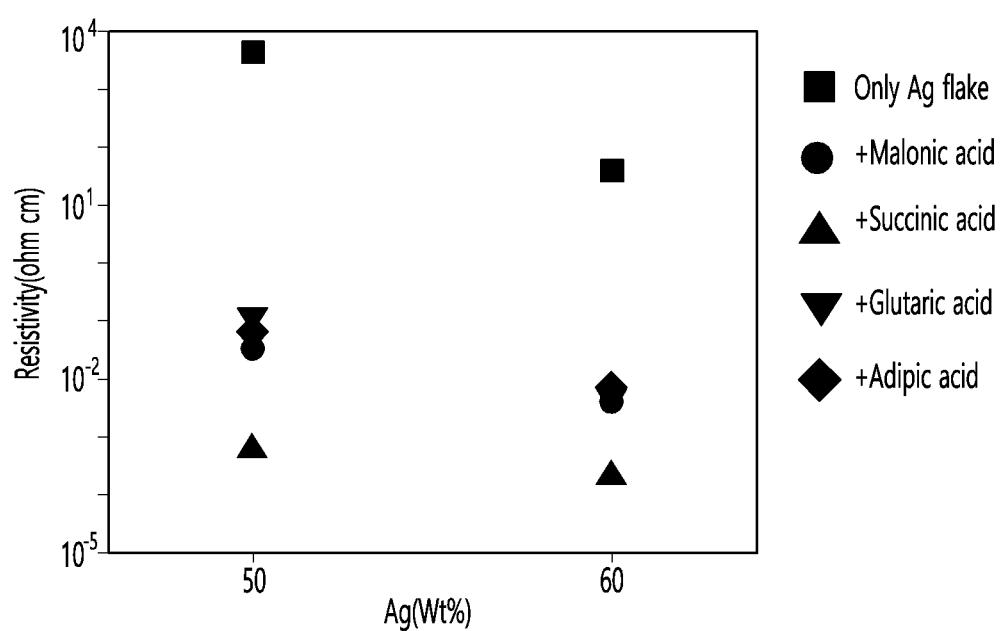
FIG. 12 shows experimental result values showing that a resistance of a conductive polymer composite is significantly lowered through a succinic acid according to one embodiment of the present invention.

More specifically, referring to FIG. 12, as compared with a case in which silver flakes are used alone, it can be confirmed that, when materials of dicarboxylic acid (—COOH) (that is, a malonic acid, an SA, a glutaric acid, and an adipic acid) are included, low resistivity is obtained. In particular, when an SA is used, it can be seen that, even when a content of silver is changed, a change in resistance value is the smallest and resistance is minimized. In other words, when an SA is used, it can be confirmed that the improvement of electrical conductivity is maximized.

According to various embodiments of the present invention, it is possible to provide a flexible electronic device which has improved electrical properties by forming a conductive polymer adhesive film on a flexible substrate using a conductive polymer adhesive to provide flexibility and stretchability and concurrently improve conductivity and minimize a decrease in conductivity due to external stress.

Effects of the present invention are not limited to the above-described effects, and other effects not described above may be clearly understood to those skilled in the art from the description below.

Although the embodiments of the present invention have been described with reference to the accompanying drawings, it should be understood that those skilled in the art can carry out other modifications without changing the technical spirit or essential features of the present invention. Therefore, it should be understood that the embodiments described herein are illustrative and not restrictive in all aspects.

Particular implementations described in the present invention are exemplary and do not limit the scope of practiced embodiments. For conciseness of the specification, the description of conventional electronic configurations, control systems, software, and other functional aspects of systems may be omitted. Moreover, connections of lines or connecting elements between components shown in the accompanying drawings may represent functional connections and/or physical or circuit connections and may represent various kinds of replaceable or additional functional connections, physical connections, or circuit connections in an actual device. Furthermore, when not specifically described using terms such as "essentially" or "importantly," elements described in the specification may not be necessarily required for application of the present disclosure.

It will be appreciated that a specific order or a hierarchical structure of steps in the presented processes and methods is one example of exemplary approaches. It will be appreciated that the specific order or the hierarchical structure of the steps in the processes within the scope of the present invention may be rearranged based on design priorities. Appended method claims provide elements used in various steps in a sample order, but this does not mean that the method claims are limited to the presented specific order or hierarchical structure.

The description of the presented embodiments is provided so that those skilled in the art of the present invention may use or implement the present invention. Various modifications of the embodiments will be apparent to those skilled in the art of the present invention, and general principles defined herein can be applied to other embodiments without departing from the scope of the present invention. Therefore, the present invention is not limited to the embodiments presented herein but should be interpreted within the widest range which is associated with the principles and new features presented herein.

What is claimed is:

1. A conductive polymer composite, comprising:
    a polymer adhesive which includes a curable polymer and a curing agent;
    a conductive filler comprising metal particles having electrical properties, wherein the conductive filler previously has had a lubricant layer; and
    a substituting agent, which comprises a succinic acid surrounding the metal particles by removing and substituting the lubricant layer, which previously has been applied on the conductive filler, wherein the succinic acid is included in a content that is greater than 0 parts by weight and is less than or equal to 10 parts by weight with respect to 100 parts by weight of the metal particles, and wherein the succinic acid surrounding the metal particles adjusts an interaction between the metal particles to improve electrical conductivity of the conductive filler,
    wherein the succinic acid is present in the conductive polymer composite after the conductive polymer composite is bonded to a flexible substrate.

2. The conductive polymer composite of claim 1, wherein the polymer adhesive has a viscosity of 3,000 mPa·s to 150,000 mPa·s, at a temperature range of 20° C. to 40° C. before curing has initiated.

3. The conductive polymer composite of claim 1, wherein the polymer adhesive has a bulk tensile strength of 0.1 MPa to 100 MPa and a volume shrinkage ratio of 1% to 20% after curing.

4. The conductive polymer composite of claim 1, wherein the polymer adhesive includes 10 to 200 parts by weight of the curing agent with respect to 100 parts by weight of the curable polymer.

5. The conductive polymer composite of claim 1, wherein the conductive polymer composite includes 100 to 500 parts by weight of the conductive filler with respect to 100 parts by weight of the polymer adhesive.

6. The conductive polymer composite of claim 1, wherein the polymer adhesive includes at least one selected from among an epoxy resin, a silicone-based resin, a urethane-based resin, an acrylic-based resin, an isoprene-based resin, a chloroprene-based resin, a fluoro-based resin, butadiene rubber, and styrene-butadiene rubber.

7. The conductive polymer composite of claim 1, wherein the polymer adhesive is a silicone-based resin.

8. The conductive polymer composite of claim 1, wherein the metal particles comprise at least one selected from among gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La), and iridium (Ir).

9. The conductive polymer composite of claim 1, wherein the metal particles are in a form of at least one of wires, flakes, particles, or tubes, and are dispersed in an organic solvent.

10. The conductive polymer composite of claim 1, wherein the metal particles have a diameter of 100 nm to 200 nm, a diameter of 1 μm to 4 μm, or a diameter of 5 μm to 10 μm.

11. The conductive polymer composite of claim 1, wherein:
    the conductive polymer composite is attachable on a flexible substrate and is used as an electrode when bonded to the flexible substrate; and
    the flexible substrate is a substrate made of at least one selected from among a silicone-based resin, a urethane-based resin, polyimide (PI), polyethylene terephthalate (PET), polyethylene naphthalate (PEN), polytetrafluoroethylene (PTFE), polystyrene (PS), and polyethersulfonate (PES).

12. The conductive polymer composite of claim 1, wherein the metal particles are silver flakes, and the succinic acid surrounding the silver flakes adjusts an interaction between the silver flakes to improve electrical conductivity of the conductive filler.

13. The conductive polymer composite of claim 1, wherein the conductive polymer composite has an adhesive strength of 0.8 to 22 N/mm$^2$.

14. A flexible electronic device comprising the conductive polymer composite of claim 1.

15. The flexible electronic device of claim 14, wherein the flexible electronic device is at least one of a flexible display, a flexible transistor, a flexible sensor, an actuator, and a solar cell.

16. A flexible electronic device comprising:
    a flexible substrate in which an auxetic including a plurality of unit structures is formed; and
    a flexible electrode formed on the flexible substrate through a conductive polymer composite,
    wherein the conductive polymer composite includes:
    a polymer adhesive which includes a curable polymer and a curing agent;
    a conductive filler comprising metal particles having electrical properties, wherein the conductive filler previously has had a lubricant layer; and a substituting agent, which comprises a succinic acid surrounding the metal particles by removing and substituting the lubricant layer, which previously has been applied on the conductive filler, wherein the succinic acid is included in a content that is greater than 0 parts by weight and is less than or equal to 10 parts by weight with respect to 100 parts by weight of the metal particles, and wherein the succinic acid surrounding the metal particles adjusts an interaction between the metal particles to improve electrical conductivity of the conductive filler, wherein the succinic acid is present in the conductive polymer composite after the conductive polymer composite is bonded to the flexible substrate.

* * * * *